C. H. WHITE & G. VEZINA.
VELOCIPEDE.
APPLICATION FILED AUG. 24, 1918.
1,301,990.
Patented Apr. 29, 1919.
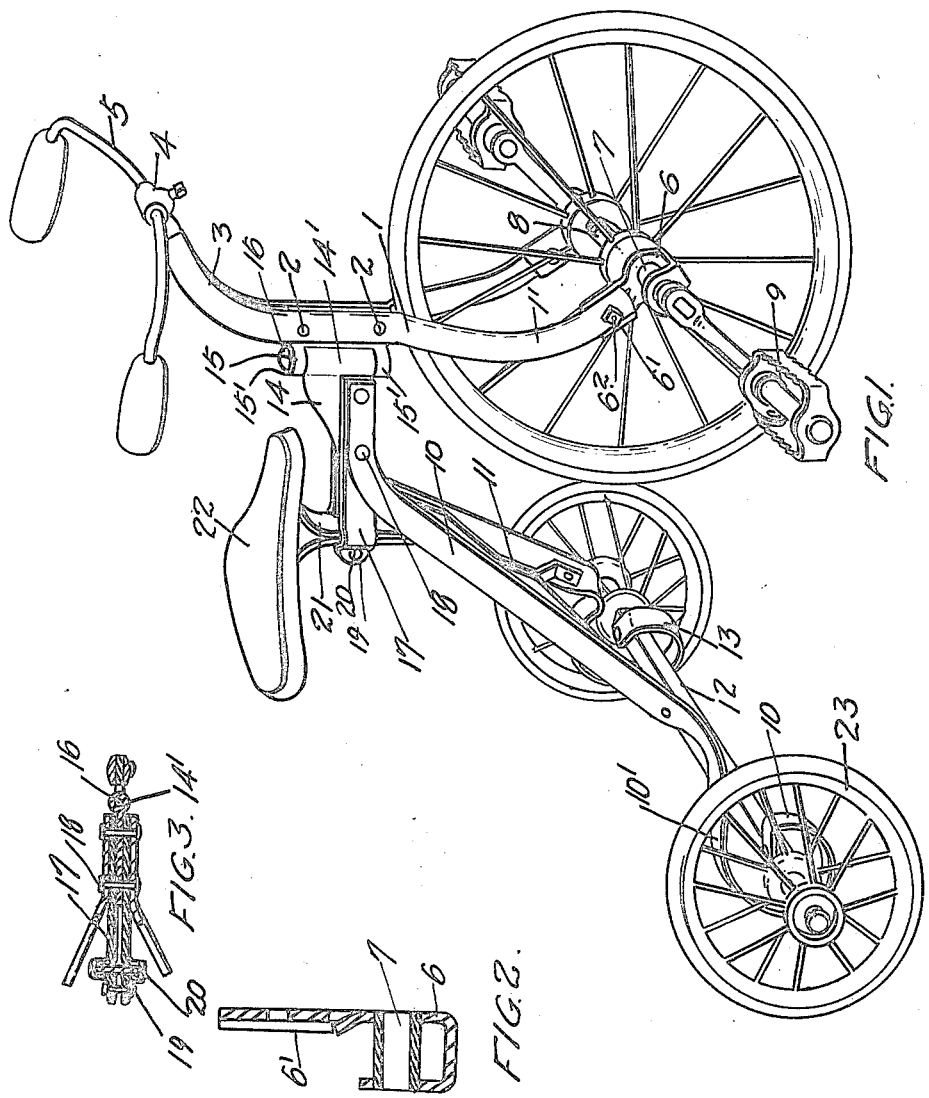
INVENTORS
CHARLES H. WHITE.
GEORGE VEZINA.

UNITED STATES PATENT OFFICE.

CHARLES HAROLD WHITE AND GEORGE VEZINA, OF TORONTO, ONTARIO, CANADA, ASSIGNORS TO THE GENDRON MANUFACTURING COMPANY, LIMITED, OF TORONTO, ONTARIO, CANADA, A CORPORATION OF ONTARIO.

VELOCIPEDE.

1,301,990.  Specification of Letters Patent.  Patented Apr. 29, 1919.

Application filed August 24, 1918. Serial No. 251,269.

*To all whom it may concern:*

Be it known that we, CHARLES HAROLD WHITE, superintendent, and GEORGE VEZINA, foreman, both of the city of Toronto, in the county of York, in the Province of Ontario, Canada, have invented certain new and useful Improvements in Velocipedes, of which the following is the specification.

Our invention relates to improvements in velocipedes, and the object of the invention is to improve the construction of the frame, whereby not only may the velocipede be made more cheaply but a stronger and more durable frame provided.

Our invention consists of a velocipede provided with a front fork and a back bone, the front fork being provided with U-shaped bearing supports for the axle and the back bone being provided with substantially C-shape spring ends secured to the axle, the back bone being braced internally and also provided at its upper end with a reinforcement at the point where it is pivotally connected to the front fork, such reinforcement extending rearwardly to carry the seat and the parts being arranged and constructed in detail as hereinafter more particularly explained.

Figure 1, is a perspective view of a velocipede provided with our improvements.

Fig. 2, is a detail of one of the lower ends of the front fork.

Fig. 3, is a sectional detail of the upper end of the back bone in proximity to its connection to the front fork.

In the drawings like characters of reference indicate corresponding parts in the various figures.

1 is the front fork which comprises two bars secured together by rivets 2 2 intermediate of their length and diverging at the bottom into a fork and at the top extending close together and curved forwardly at 3 to receive the bracket 4 in which the handle bars 5 are held. The lower portions of the bar 1 form the fork 1' and are curved in form as shown, so as to straddle the wheel. The extremity of each member of the fork has connected to it the bearing bracket 6, which is U-shaped in form at the bottom to receive the sleeve 7, which actually forms the bearing for the front axle 8 carrying the pedals and pedal frame 9. The upper end of each bracket 6 is provided with outwardly extending side ribs 6' between which the lower extremity of each member of the fork 1' fits being secured therein by suitable bolts 6².

10 is the back bone, which is braced by the bars 11 secured together at the center and to the sides of the back bone. The extremities of the members of the bone are in substantially C-shape form 10', the extreme ends being bent substantially at right angles and secured to the axle 12 by means of bolts 13 as indicated.

The upper end of the fork 10 has a forward bend, which extends on each side of the bracket 14, which is pivotally connected to the bracket 15 secured between the members of the fork 1 by means of the bolt 16, which extends through the hollow boss 14' at the forward end of the bracket 14 and the ends 15' of the bracket 15. 17 is a double bar, which is located at the front between the upper ends of the fork 10. The double bar 17 has a fork located on each side of the bracket 14 and bolts 18 serve to fasten the upper ends of the fork 10 double bar 17 and the bracket 14 together. The rear ends of the double bar 17 are connected together by a bolt 19 to the rear of the offsets 20. The off-sets 20 serve to provide a recess to receive the stem 21 of the seat 22.

It will be seen from this description that a velocipede constructed in accordance with our invention is made in the cheapest manner possible both as to the bearings, as to the front fork and the connection of the back bone to the axle upon the ends of which rear wheels 23 are journaled.

The connection of the back bone to the front fork and the provision for the seat is also simplified and strong and durable.

What we claim as our invention is—

1. In a velocipede, the combination with a front fork formed of two members fastened together intermediate of their length, a bracket secured between the members of the fork where they come together, a backbone having forwardly extending upper ends, a second bracket, said back bone ends extending on each side of said second bracket and being supported thereby, reinforcing bars for the back bone and a bolt connecting the two brackets and means for connecting the lower members of the front fork and the back bone to the front and rear axles, respectively.

2. In a velocipede, a front fork comprising two members suitably secured together intermediate of their length and bearing brackets secured to the lower extremities of the members of the fork and comprising U-shaped members having side ribs and bolts securing the upper end of the U-shape members to the extremities of the fork between the side ribs, and a sleeve extending through the U-shape lower ends of the brackets.

3. In a velocipede, a back bone having internal braces and means for suitably connecting them to the back bone and having lower C-shape ends and bolts securing them to the rear axle.

4. In a velocipede, the combination with a front fork and a back bone provided with bent upper ends, of a bracket connected to the front fork, a bracket secured between the bent upper ends of the back bone and pivotally connected to the bracket on the front fork, bars located on each side of the second mentioned bracket secured between the bent upper ends of the rear fork and extending on each side of the second mentioned bracket, and provided with off-sets forming a socket, and a seat provided with a stem fitting the socket.

CHARLES HAROLD WHITE.
GEORGE VEZINA.

Witnesses:
M. EGAN,
N. CARTER.